(No Model.)
A. W. SPERRY.
SHARPENER FOR KNIVES, &c.
No. 290,367. Patented Dec. 18, 1883.
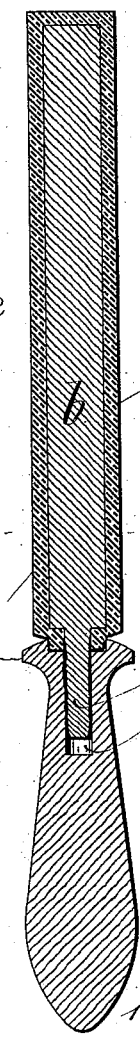
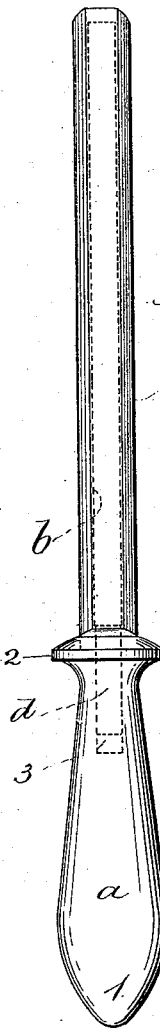
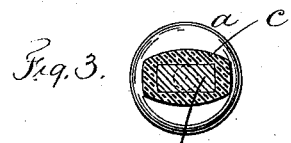

United States Patent Office.

ALFRED W. SPERRY, OF HARTFORD, CONNECTICUT, ASSIGNOR TO HIMSELF AND THOMAS J. MONTGOMERY, OF BOSTON, MASSACHUSETTS.

SHARPENER FOR KNIVES, &c.

SPECIFICATION forming part of Letters Patent No. 290,367, dated December 18, 1883.

Application filed July 20, 1883. (No model.)

*To all whom it may concern:*

Be it known that I, ALFRED W. SPERRY, of Hartford, in the State of Connecticut, have invented a new and useful Improvement in Sharpeners for Knives and other Cutting Implements; and the following is declared to be a description of the same.

Sharpeners for knives, scythes, and like cutting implements usually consist of a flat stick having a handle at one end, and the surfaces of the two sides covered with emery composition. There is nothing neat in the appearance of these sticks or sharpeners, there is no guard or protection to the hand while sharpening the knife or scythe, and the coating of emery, being very thin on the sides, soon wears off and does not add any strength to the parts.

The object of my invention is to produce a superior article for sharpening purposes; and to this end I employ a handle of convenient shape, upon the lower end of which is a guard for protecting the fingers when sharpening a tool, and also a core (preferably of flat wood) having a shank at one end. The core is to be covered with an emery composition, and the shank connects the sharpening-blade and handle together.

The composition I employ upon the sharpening-blade is described in an application for Letters Patent made by me of like date herewith.

In the drawings, Figure 1 is an elevation of my sharpening implement. Fig. 2 is a vertical section of the same, and Fig. 3 is a cross-section at *x x*.

The handle *a* is preferably made of about the shape shown, the end 1 being rounded, and the end 2 being made as a guard to protect the fingers and hand from the edge of the implement being sharpened. There is a hole in the handle at 3 for the shank *d*, and a recess at the mouth of said hole for the reception of the end of the composition of the blade adjacent to the shank.

The part of the stick *b* forming the core of the emery-blade is preferably of flat sectional form, and said part is entirely covered with the composition *c*, before referred to. The shank *d*, which is preferably made round, and of a size that will easily enter the hole 3 in the handle when the parts are connected together, is not coated at this part of the process.

The stick or core *b* is coated with the composition referred to in a suitable mold, each half of the mold being filled with composition, the core *b* being placed therein as the halves of the mold are pressed together, and after the composition has become set and hardened the blade is ready to be secured in the handle. This is done by coating the shank *d* and end of the blade around the same with some of the composition heretofore referred to. The shank *d* is then pressed into the hole 3. The composition *c* of the blade adjacent to the shank entering the recess in the end of the handle, and the coating of composition upon the shank being allowed to harden, the two parts are joined and made as one.

I claim as my invention—

1. A sharpener for knives and other cutting implements, composed of the handle *a* and guard 2, the stick or core *b*, having a rounded end, *d*, and the composition covering *c*, substantially as set forth.

2. A sharpener for knives and other cutting implements, composed of a handle, *a*, a core, *b*, composition covering *c* upon said core, and means, substantially as described, for connecting the handle and core together, for the purposes set forth.

Signed by me this 13th day of July, A. D. 1883.

ALFRED W. SPERRY.

Witnesses:
 DAVID L. ABERDEIN,
 HUGH O'FLAHERTY.